United States Patent

Endo et al.

[15] 3,702,435

[45] Nov. 7, 1972

[54] ELECTRIC POWER CONTROL DEVICE

[72] Inventors: Yoshitaka Endo; Katsumi Tomiyama, both of Kamakura; Yasushi Takanashi, Nitta-gun, all of Japan

[73] Assignee: Mitsubishi Denki Kabushiki Kaisha, Tokyo, Japan

[22] Filed: Jan. 27, 1971

[21] Appl. No.: 110,229

[30] Foreign Application Priority Data

Jan. 31, 1970 Japan ........................45/8849

[52] U.S. Cl................323/22 SC, 219/212, 219/494, 307/133, 307/252 UA

[51] Int. Cl............................G05f 1/44, H03k 17/00

[58] Field of Search...307/133, 252 N, 252 UA, 109; 323/22 T, 22 SC, 24; 219/113, 114, 115, 212, 494; 320/1

[56] References Cited

UNITED STATES PATENTS

| | | | |
|---|---|---|---|
| 3,577,010 | 5/1971 | Freyling, Jr. et al. | 307/252 UA |
| 3,335,291 | 8/1967 | Gutzwiller | 307/252 |
| 3,458,800 | 7/1969 | Bross | 307/133 X |
| 3,543,005 | 11/1970 | Kelemen | 219/212 X |

*Primary Examiner*—Gerald Goldberg
*Attorney*—Robert E. Burns and Emmanuel J. Lobato

[57] ABSTRACT

The disclosed electric power control device utilizes a semiconductor control device and a capacitor. The capacitor is so arranged to be charged during a voltage in the reverse direction applied to the semiconductor control device, and to discharge through a control electrode of the control device when the forward voltage applied to the semiconductor control device is zero or when the voltage exhibits reverse polarity, thereby to switch the semiconductor control device at a zero crossing point of the a.c. voltage from the source.

2 Claims, 11 Drawing Figures

ELECTRIC POWER CONTROL DEVICE

BACKGROUND OF THE INVENTION

This invention relates to an electric power control device utilizing a semiconductor control device.

An electric power control device utilizing a unidirectional semiconductor control device, is known which uses a phase control system wherein the semiconductor control device used is controlled in firing phase to adjust the conductor angle for the voltage from the electric source. With the conventional power control device of this type, however, there has arisen a problem of radio wave interference due to spike voltages generated upon switching the semiconductor control device especially in case that a resistor is used as a load or a high control current is applied.

In order to overcome the problem of radio wave interference, there has been proposed the use of a zero crossing point firing system wherein the control device is adapted to fire at the zero crossing point of the voltage from the electric source. Although this system is theoritically possible, it has been difficult to apply to electric appliances of relatively low price such as domestic electric appliances because of the high cost and the complex arrangement of the system.

SUMMARY OF THE INVENTION

Accordingly, an object of the invention is to provide an electric power control device capable of effecting zero crossing point firing of a semiconductor control device and free from spike voltages which often cause radio wave interferences.

Another object of the invention is to provide an electric power control device capable of effecting zero crossing point firing with a simple and less expensive construction.

The invention accomplishes these objects by the provision of an electric power control device comprising a semiconductor control device connected between an a.c. power source and a load, a capacitor charged during a period of time during which an a.c. voltage from the a.c. power source exhibits a reverse polarity with respect to the semiconductor control device, a switching element for discharging the electric charge stored in the capacitor through a control electrode of the semiconductor control device, and a signal generating circuit for operating the switching element when a forward voltage applied to said semiconductor control device is zero or when the voltage from the a.c, power source exhibits a reverse polarity with respect to the semiconductor control device.

This signal generating circuit preferably comprises a variable impedance element, whereby the signal generating circuit is controlled in its signal generating timing in accordance with the variation in impedance of the variable impedance element.

In a preferred embodiment of the invention, the electric power control device comprises a semiconductor control device connected between an a.c. power source and a load. A first capacitor is connected in parallel with the semiconductor control device and charged during a period of time during which an a.c. voltage from the a.c. power source exhibits a reverse polarity with respect to the semiconductor control device, a second capacitor connected to the power source through a variable impedance element; a discharge circuit for the first capacitor is connected to a control electrode of the semiconductor control device through a switching element; and another discharge circuit for the second capacitor connected between said second capacitor and said switching element.

The variable impedance element may be a heating element comprising a heating wire, a signal line and a thermosensitive layer exhibiting an impedance of a negative resistance-to-temperature coefficient and sandwitched between the heating wire and the signal line. The heating wire is connected in series with the semiconductor control device and said signal line is connected to the second capacitor.

BRIEF DESCRIPTION OF THE DRAWING

The invention will become more readily apparent from the following detailed description taken in conjunction with the accompanying drawing in which.

Throughout several Figures the same reference numerals designate the indetical or corresponding components.

DESCRIPTION OF THE PREFERRED EMBODIMENT

Figure 1:
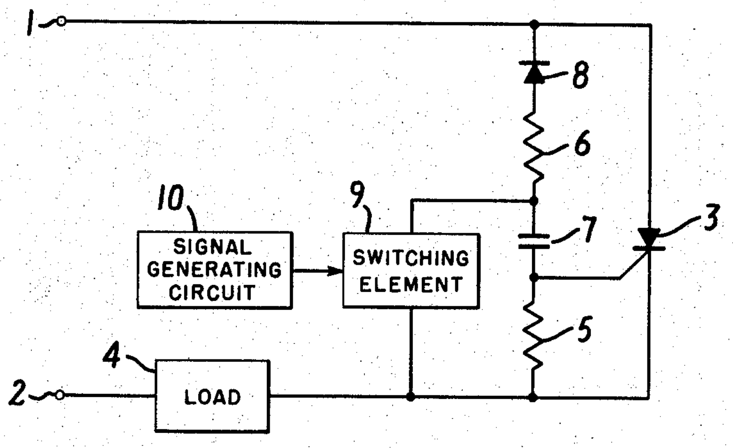
FIG. 1 is a schematic circuit diagram of the electric power control device of the invention.

Referring now to the drawing and in particular to FIG. 1 wherein the present invention is illustrated in schematic diagram, it is seen that between two terminals 1 and 2 for an a.c. power source (not shown), a semiconductor control device 3, such as a silicon controlled rectifier, and a load 4 are serially connected. Connected between an anode and cathode electrodes of the semiconductor control device 3 in parallel with the same is a firing control circuit for controlling firing of the semiconductor control device 3. The firing control circuit comprises two resistors 5 and 6, a capacitor 7 and a diode 8 in series. The diode 8 is connected in such a direction that it permits the capacitor 7 to be charged when the voltage from the voltage source is in such polarity that the semiconductor control device 3 is biased in a reverse direction. The semiconductor control device 3 is also connected at its control electrode to a junction between the one of the resistors, namely the resistor 5, and the capacitor 7. This resistor 5 is connected between the cathode and control electrodes of the semiconductor control device 3. The resistor 5 may be replaced by a diode connected in the same direction as the diode 8 in terms of its polarity.

It is also seen that a switching element 9 is connected in parallel with the resistor 5 and the capacitor 7 to be inserted between the cathode electrode of the semiconductor control device 3 and a circuit point between the capacitor 7 and the resistor 6. Therefore, when the switching element 9 is in a conductive state, the electric charge stored in the capacitor 7 discharges through the control electrode of the semiconductor control device 3. In order to operate the switching element 9, a signal generating circuit 10 applies its output to the element 9. The signal generating circuit 10 produces and supplies to the switching element 9, a signal for rendering the element 9 conductive at the zero-voltage point at which the polarity of the voltage applied to the semiconductor control device 3 is inverted from a reverse direction into a forward direction with respect to the control device 3 or during a period of the cycle in which the polarity of the applied voltage is in the reverse direction.

Figure 2:
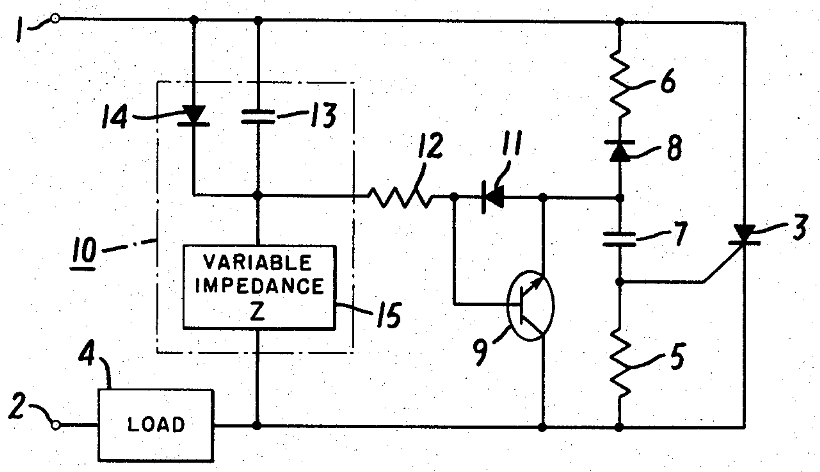
FIG. 2 is an electric circuit diagram illustrating one embodiment of the electric power control device of the invention.
Figure 3A:
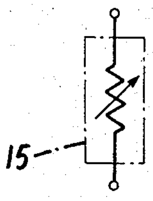
FIGS. 3*a*, *b*, *c* and *d* are circuit diagrams showing examples of the variable impedance element for use the circuit shown in FIG. 2.
Figure 3B:
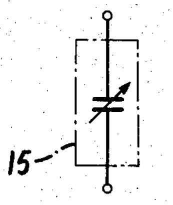
Figure 3C:
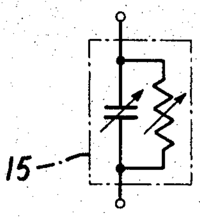
Figure 3D:
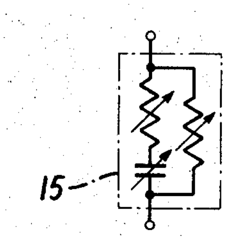

Referring now to FIG. 2 wherein the electric power control device of the invention is illustrated in a circuit diagram, it is seen that the switching element 9 is illustrated as being a transistor 9. The components designated by the reference numerals 1 to 8 inclusive are quite identical to those shown in FIG. 1. The transistor 9 is connected at its emitter to the junction between the capacitor 7 and the diode 8 and its collector electrode to the cathode electrode of the semiconductor control device 3. In order to control the conduction and nonconduction of the transistor 9, the base electrode thereof is connected to another junction between a diode 11 and a resistor 12. The diode 11 is connected in such a direction that it permits the charging current, which charges the capacitor 7 during the period of reverse bias cycle in terms of the semiconductor control device 3, to charge also a capacitor 13 serially connected to the resistor 12 through the resistor 12, and that it prevents the emitter-to-base path of the transistor 9 from being applied a reverse voltage. The diode 11 may be replaced by a resistor. Connected in parallel with the capacitor 13 is another diode 14 connected in such a direction that the capacitor 13 is charged only during the reverse bias cycle for the semiconductor control device 3.

FIG. 2 also shows that the circuit includes a variable impedance element 15 which is connected between the junction between the resistor 12, the capacitor 13 and the diode 14 and the anode electrode of the semiconductor control device 3. The variable impedance element 15 may be connected between the above-mentioned junction and the source terminal 2. Several examples of the circuit arrangement of the variable impedance element which may be a variable resistor, a variable capacitor or their combinations are illustrated in FIGS. 3*a* to *d* inclusive. The capacitor 13, the diode 14 and the variable impedance element 15 compose the signal generator circuit generally designated by the reference numeral 10.

The operation of the circuit arrangement illustrated in FIG. 2 will now be described. With the assumption that the variable impedance element 15 has an impedance high enough, in the reverse bias cycle with respect to the semiconductor control device 3, i.e., in the period during which the source terminal 2 is positive, the capacitor 7 is charged through the resistor 5 by the parallel circuit composed of the resistor 6, the diode 8, the diode 11, the resistor 12 and the capacitor 13 because the transistor 9 is reversely biased and brought into its cut-off state at this point in time. Thus, charging continues until the sum value of the charged voltages of this charged capacitor 7 and the capacitor 13 reaches a magnitude equal to the source voltage. After this sum value has reached a value equal to the source voltage, the electric charge stored in the capacitor 13 discharges through the circuit composed of the resistor 12, the base-emitter path of the transistor 9, the diode 8 and the resistor 6 in proportion to the decrease in magnitude of the source voltage. This causes the transistor 9 to be in an operative or conductive state. Therefore, the electric charge stored in the capacitor 7 is discharged through the control and cathode electrodes of the semiconductor control device 3 and the transistor 9, to thereby fire the semiconductor control device 3. The time point at which the semiconductor control device 3 fires can be set at the zero-voltage point at which the polarity of the source voltage is inverted from the reverse direction to the forward direction by just properly adjusting the respective values of the capacitors 7 and 13 and the resistor 12.

Figure 4A:
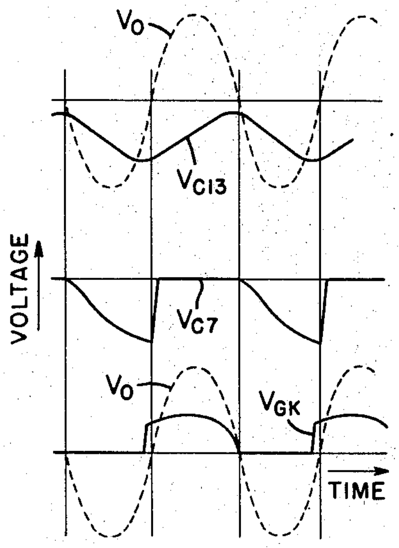
FIGS. 4*a* and *b* show voltage waveforms useful in explaining the operation of the circuit shown in FIG. 2.

The operation of the circuit arrangement heretofore described will become more readily apparent by referring to the voltage waveforms shown in FIG. 4*a*, wherein the reference characters $V_{C7}$ and $V_{C13}$ represent the waveforms of the charged voltages in the capacitors 7 and 13 respectively, the reference character $V_{GK}$ represents the waveform of the voltage across the control and cathode electrodes of the semiconductor control device 3, and the reference character $V_0$ represents the waveform of the voltage from the a.c. voltage source.

On the other hand, in the event that the impedance of the variable impedance element 15 becomes low, the capacitor 13 is charged not only through the capacitor 7 but also through the variable impedance element 15. This results in a steeper rising of the charged voltage and, therefore the point in time at which the sum of charged voltages in the capacitors 7 and 13 reaches a value equal to the source voltage advances as compared with that of a case wherein the variable impedance element 15 exhibits a high impedance value. Consequently, the transistor 9 is in its conductive state at an earlier point in time to discharge the electric charge stored in the capacitor 7.

Figure 4B:
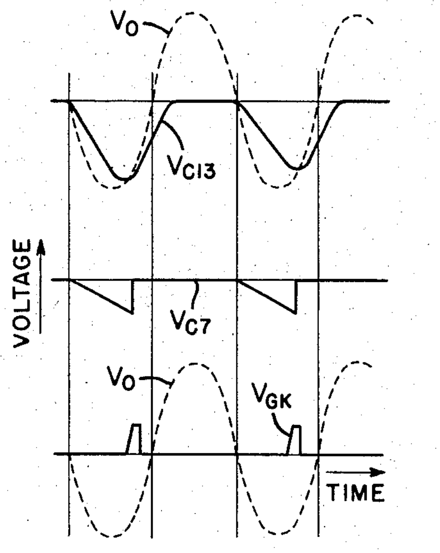

The operation of the circuit arrangement as heretofore described will become more readily apparent by referring to FIG. 4*b*, wherein the reference characters $V_{C7}$, $V_{C13}$, $V_{GK}$ and $V_0$ represent the waveforms of the corresponding voltages to those shown in FIG. 4*a* respectively. As seen from the waveforms of FIG. 4*b*, the discharge operation of the capacitor 7 is performed during the reverse bias cycle with respect to the semiconductor control device 3, so that the semiconductor control device 3 remains in its nonconductive state when the impedance of the variable impedance element 15 becomes low.

From the foregoing description, it will be understood that the switching operation of the semiconductor control device 3 can be controlled by adjusting the variable impedance element 15, and that the zero crossing point firing can be easily performed by selecting a suitable time constant of the circuit. With the circuit arrangement shown in FIG. 2, since the operation of the transistor 9 can never make a rapid change from its cut-off state to its saturation state. Therefore, the firing current for the semiconductor control device 3 continues to flow for a period of a certain time, permitting the above-described circuit arrangement to have a time constant of relatively high degree of freedom.

Figure 5:
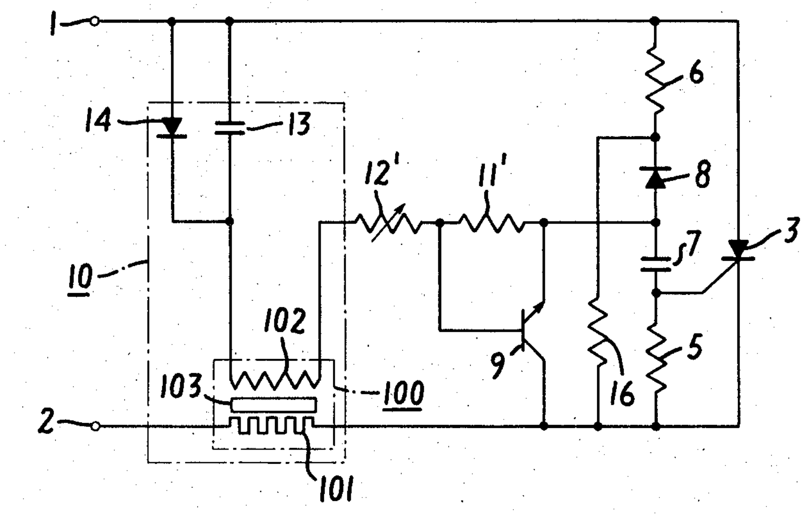
FIG. 5 is an electric circuit diagram illustrating an example of the electric power control device of the invention applied to a temperature control device for an electric blanket.
Figure 6:
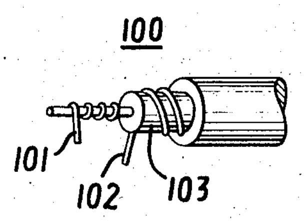
FIG. 6 is a fragmentary perspective view for showing the internal structure of the heating element for use in the temperature control device shown in FIG. 5.

Referring now to FIG. 5, wherein the invention is applied to a temperature control device for an electric blanket, it is seen that the circuit includes a heating element generally designated by the reference numeral 100 and encircled by a dot-and-dash line. The heating element 100 is composed of a heating wire 101 connected to the source terminal 2, a signal line 102 connected between the base electrode of the transistor 9 and the capacitor 13, and a thermosensitive layer 103 disposed between the heating wire 101 and the signal line 102. Comparing the circuit illustrated in FIG. 5 with that of FIG. 2, it is readily understood that the heating wire 101 and the thermosensitive layer 103 of FIG. 5 correspond to the load 4 and the impedance element 15 of FIG. 2 respectively. In other words, the load 4 and the variable impedance element 15 of FIG. 2 are replaced by the heating element 100. The heating element 100 itself is of the conventional design as illustrated in FIG. 6, and its thermosensitive layer 103 is formed of a thermistor or the like exhibiting a negative coefficient for the impedance-to-temperature characteristic.

Figure 7:
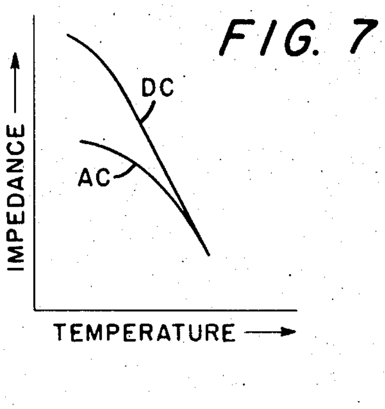
FIG. 7 is a diagram illustrating impedance-to-temperature characteristic curves of the heating element shown in FIG. 6.

FIG. 7 shows the impedance-to-temperature characteristics of the thermosensitive layer 103 which are those of a negative coefficient, i.e., the impedance of which decreases in proportion to the elevation of temperature.

The thermosensitive layer 103 can be considered to be an equivalent to a parallel circuit composed of a resistor and a capacitor of which the capacitance varies depending upon the variation in temperature. Therefore, the thermosensitive layer 103 corresponds to the variable impedance element 15 of FIG. 2 and, therefore, when connected to such a circuit arrangement as shown in FIG. 5, the switching operation of the semiconductor control device 3 can be controlled in accordance with the temperature of the heating element 101 as similar to the circuit shown in FIG. 2.

On the other hand, the heating element 101 can be controlled in its temperature by controlling the value of the impedance of the thermosensitive layer 103 which is used for switching the semiconductor control device 3. This is because the capacitor 13 varies in its capacitance depending upon the resistance of a variable resistor 12' which replaces the resistor 12 shown in FIG. 2.

In order to protect the transistor 9 from an overvoltage across the base and collector electrodes when the semiconductor control device 3 is in its nonconductive state or when the heating element is high in temperature, a resistor 16 is connected between the junction between the resistor 6 and the diode 8 and the collector electrode of the transistor 9.

What we claim is:

1. An electric power control device comprising, a semiconductor control device connected between an a.c. power source and a load and having a control electrode, a first capacitor connected in parallel with said semiconductor control device and charged during a period of time during which an a.c. voltage from the a.c. power source exhibits a reverse polarity with respect to said semiconductor control device, a variable impedance element, a second capacitor connected to the power source through said variable impedance element, a switching element, a discharge circuit for the first capacitor connected to said control electrode of said semiconductor control device through said switching element, and another discharge circuit for the second capacitor connected between said second capacitor and said switching element.

2. An electric power control device as claimed in claim 1, wherein said variable impedance element is a heating element comprising a heating wire, a signal line and a thermosensitive layer exhibiting an impedance of a negative resistance-to-temperature coefficient and sandwiched between the heating wire and the signal line, said heating wire being connected in series with said semiconductor control device and said signal line being connected to said second capacitor.

* * * * *